(12) United States Patent
Richey et al.

(10) Patent No.: US 7,885,992 B2
(45) Date of Patent: Feb. 8, 2011

(54) SYSTEM AND METHOD FOR IMPLEMENTING IRREGULAR DATA FORMATS

(75) Inventors: Manuel F. Richey, Paola, KS (US); Timothy P. Gibson, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 915 days.

(21) Appl. No.: 11/759,512

(22) Filed: Jun. 7, 2007

(65) Prior Publication Data
US 2007/0299898 A1    Dec. 27, 2007

Related U.S. Application Data

(60) Provisional application No. 60/815,821, filed on Jun. 22, 2006, provisional application No. 60/865,991, filed on Nov. 15, 2006.

(51) Int. Cl.
*G06F 7/483* (2006.01)
(52) U.S. Cl. .................................................. 708/495
(58) Field of Classification Search .................. None
See application file for complete search history.

(56) References Cited

U.S. PATENT DOCUMENTS

| 7,321,914 B2* | 1/2008 | Kurnik ................. 708/495 |
| 7,397,399 B2* | 7/2008 | Thebault et al. .......... 341/67 |
| 2005/0182810 A1* | 8/2005 | Kurnik ................. 708/495 |
| 2007/0260666 A1* | 11/2007 | Sweeney .............. 708/513 |

* cited by examiner

*Primary Examiner*—David H Malzahn
(74) *Attorney, Agent, or Firm*—Fogg & Powers LLC

(57) ABSTRACT

A computer system comprises a processing unit configured to process fixed size data words comprising at least one exponent field of variable size and a mantissa of variable size; an input device configured to provide data words to the processing unit; and an output device configured to output data words processed by the processing unit.

19 Claims, 10 Drawing Sheets

| Format<br>S = sign bit<br>M = mantissa<br>0 = exponent<br>1 = separator | Significant Binary Digits<br>(assuming normalized<br>Mantissa) | Identifier (for later reference) |
|---|---|---|
| S1MMMMMMMMMMMM1 | 14 | A1 |
| S1MMMMMMMMMMM10,<br>S01MMMMMMMMMMM1 | 13 | B1<br>B2 |
| S1MMMMMMMMMMM00,<br>S01MMMMMMMMMM10,<br>S001MMMMMMMMMM1 | 12 | C1<br>C2<br>C3 |
| S1MMMMMMMMM1000,<br>S01MMMMMMMMM100,<br>S001MMMMMMMMM10,<br>S0001MMMMMMMMM1 | 11 | D1<br>D2<br>D3<br>D4 |
| 5 values | 10 | E1-E5 |
| . . . | . . . | |
| S110000000000000,<br>. . .<br>S000000000000011 | 1 | M1-M14 |
| S100000000000000,<br>. . .<br>S000000000000001 | 1 | N1-N15 |
| S000000000000000 | 0. Note: S=1 could be reserved for irregular data such as NAN or ∞, but S=0 should represent 0. | O1, O2 |

| Format<br>S = sign bit<br>M = mantissa<br>0 = exponent<br>1 = separator | Significant Binary Digits (assuming normalized Mantissa) | Identifier (for later reference) |
|---|---|---|
| S1MMMMMMMMMMMM1 | 14 | A1 |
| S1MMMMMMMMMMM10,<br>S01MMMMMMMMMMM1 | 13 | B1<br>B2 |
| S1MMMMMMMMMMM00,<br>S01MMMMMMMMMMM10,<br>S001MMMMMMMMMMM1 | 12 | C1<br>C2<br>C3 |
| S1MMMMMMMMMM1000,<br>S01MMMMMMMMM100,<br>S001MMMMMMMMMM10,<br>S0001MMMMMMMMM1 | 11 | D1<br>D2<br>D3<br>D4 |
| 5 values | 10 | E1-E5 |
| . . . | . . . | |
| S110000000000000,<br>. . .<br>S000000000000011 | 1 | M1-M14 |
| S100000000000000,<br>. . .<br>S000000000000001 | 1 | N1-N15 |
| S000000000000000 | 0. Note: S=1 could be reserved for irregular data such as NAN or ∞, but S=0 should represent 0. | O1, O2 |

FIG. 3

| Format at (an implied 1.MMM...)<br>S = sign bit<br>M = mantissa<br>0 = exponent<br>1 = separator | Exponent | Binary Digits of Precision | Figure 3 Format |
|---|---|---|---|
| SMMMMMMMMMMMMM10 | 16384 | 14 | B1, C2, D3,...,M13 |
| S1MMMMMMMMMMMM1 | 8192 | 14 | A1 |
| S 0 1MMMMMMMMMMM1 | 4096 | 13 | B2 |
| S 0 0 1MMMMMMMMMM1 | 2048 | 12 | C3 |
| S 0 0 0 1MMMMMMMMM1 | 1024 | 11 | D4 |
| . . . | | . . . | |
| SMMMMMMMMMMM1 0 0 0 | 0.5 | 12 | One each from D through M |
| S 1MMMMMMMMMM1 0 0 | 0.25 | 12 | C1 |
| S 0 1MMMMMMMMM1 0 0 | 0.125 | 11 | D2 |
| S 0 0 1MMMMMMMM1 0 0 | 0.0625 | 10 | E3 |
| . . . | | . . . | |
| S 0 0 0 0 0 0 0 0 0 0 0 0 0 1 | $2^{-26}$ | 1 | N15 |
| 0 0 0 0 0 0 0 0 0 0 0 0 0 0 0 0 | 0 | 0 | O1 |

FIG. 4

| Numeric Range | Format<br>S = sign bit<br>M = mantissa<br>0 = exponent<br>1 = separator<br>not outlined = actual digit<br>outlined = implied digit | Significant Binary Digits | Figure 3 Format |
|---|---|---|---|
| 1.0-0.5 | S 0. 1 M M M M M M M M M M M M 1 | 14 | A1 |
| 0.5-0.25 | S 0. 01 M M M M M M M M M M M 1 | 13 | B2 |
| 0.25-0.125 | S 0.00 1 M M M M M M M M M M M 1 0 | 13 | B1 |
| 0.125-0.0625 | S 0.00 01 M M M M M M M M M M 1 0 | 12 | C2 |
| 0.0625-0.03125 | S 0.0000 1 M M M M M M M M M M 1 0 0 | 12 | C1 |
| 0.03125-0.015625 | S 0.0000 001 M M M M M M M M M 1 | 12 | C3 |
| 0.015625-0.0078125 | S 0.0000 0001 M M M M M M M M M 1 | 11 | D4 |
| 0.0078125-0.00390625 | S 0.0000000 1 M M M M M M M M M 1 0 0 0 | 11 | D1 |
| 0.00390625-0.001953125 | S 0.0000000 01 M M M M M M M M M 1 0 0 | 11 | D2 |
| 0.001953125-0.0009765625 | S 0.0000000 001 M M M M M M M M M 1 0 | 11 | D3 |
| ... | ... | ... | |
| | S 0."76 0s" 000000000000001 | 1 | N15 |
| 0.0 | 0000000000000000 | 0 | O1 |

| Numeric Range | Format<br>S = sign bit<br>M = mantissa<br>0 = exponent<br>1 = separator<br>not outlined = actual digit<br>outlined = implied digit | Significant Binary Digits | Figure 3 Format |
|---|---|---|---|
| 1.0-0.5 | S[0] 1 MMMMMMMMMMMMM1 | 14 | A1 |
| 0.5-0.25 | S[0 0] 1 MMMMMMMMMMMM1 0 | 14 | B1, C2, D3,..., N14 |
| 0.05-0.125 | S[0 0] 0 1 MMMMMMMMMMMM1 | 13 | B2 |
| 0.125-0.0625 | S[0 0 0] 1 MMMMMMMMMMM1 0 0 | 13 | C1, D2, ... |
| 0.0625-0.03125 | S[0 0] 0 0 1 MMMMMMMMMMM1 | 12 | C3 |
| 0.03125-0.015625 | S[0 0 0] 0 0 0 1 MMMMMMMMMM1 0 0 0 | 12 | D1, E2, ... |
| 0.015625-0.0078125 | S[0 0] 0 0 0 0 0 1 MMMMMMMMMM1 | 11 | D4 |
| 0.00078125-0.00390625 | S[0 0 0] 0 0 0 0 0 1 MMMMMMMMM1 0 0 0 0 | 11 | E1, F2, ... |
| 0.00390625-0.001953125 | S[0 0 0] 0 0 0 0 0 0 1 MMMMMMMMM1 | 10 | E5 |
| ... | | ... | |
| | S[0.  16  0s 0 0 0 0 0 0 0 0 0 0 0 0 0 0 0 1] | 1 | N15 |
| 0.0 | 0 0 0 0 0 0 0 0 0 0 0 0 0 0 0 0 0 0 | 0 | O1 | ically intensive, and specialized processors have been developed specifically to implement these algorithms. The specialized processors are often referred to as DSPs, and they are typically orders of magnitude faster for implementing DSP algorithms than a traditional processor would be.

When developing an embedded DSP system, implementation decisions are made based on the system's application and environment. Common factors considered in such decisions include system cost, system size, power requirements, the processor, the primary data format, and programming language to be used. Many DSP systems must be tiny, such as those used in medical implants. Others must be inexpensive, such as those used in consumer electronic devices. These types of applications are usually implemented in 16-bit DSPs because 16-bit DSPs are small, inexpensive, and extremely fast. Few DSP applications can actually be implemented at high speed in 8-bit processors, and 32-bit systems are both larger and more expensive than their 16-bit siblings. However, many applications cannot use 16-bit devices because their primary data formats have reduced dynamic range and increased round-off noise when compared to those of 32-bit device.

There are compelling reasons for programming a DSP in a higher order language, and the C family of languages is predominantly used for programming 16-bit DSPs. However, programming a 16-bit DSP in a higher order language is problematic partially due to the standard numeric formats available in higher order languages. There is no native format in standard C that is very suitable for signal processing on 16 bit machines. For example, the float type is typically implemented using the 32-bit IEEE Standard 754 floating point format (Institute of Electrical and Electronics Engineers [IEEE], 1985). In fact, this format is mandated for floating point in the 1999 standard (ISO, 2003). IEEE 32-bit floating point format is very comprehensive, but potentially very slow. If it is implemented in assembly language on a 16-bit DSP, arithmetic operations can take orders of magnitude longer to execute than equivalent fixed-point operations (Smith, 1999, p. 85), which are implemented directly in hardware.

The C int type maps to a 16-bit twos compliment fixed-point number, and executes very fast. But since DSP algorithms involve a significant number of multiplications, and the product of a 16×16 bit multiplication is a 32-bit number, the int type is highly susceptible to overflow. It also introduces significant noise because it uses truncation rather than rounding, and employs overflow rather than saturation. Finally, it has only limited dynamic range when compared to the float format.

For the reasons stated above, and for reasons that shall become apparent to one of skill in the art, there is a need in the art for a system implementing an improved data format.

SUMMARY

The above mentioned problems and other problems are resolved by the present invention and will be understood by reading and studying the following specification.

In one embodiment, a computer system provided. The computer system comprises a processing unit configured to process fixed size data words comprising at least one exponent field of variable size and a mantissa of variable size; an input device configured to provide data words to the processing unit; and an output device configured to output data words processed by the processing unit.

DRAWINGS

Features of the present invention will become apparent to those of skill in the art from the following description with reference to the drawings. Understanding that the drawings depict only exemplary embodiments of the present invention and are not to be considered limiting in scope, the invention will be described with additional specificity and detail through the use of the accompanying drawings in which:

FIG. 3 is a table showing a class of 16-bit irregular data formats according to embodiments of the present invention.

FIG. 4 is a table showing a 16-bit irregular half format according to one embodiment of the present invention.

FIG. 6 is a table showing a first 16-bit irregular fractional format according to one embodiment of the present invention.

FIG. 8 is a table showing a second 16-bit irregular fractional format according to another embodiment of the present invention.

DETAILED DESCRIPTION

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense. In particular, the following detailed description discusses embodiments of the invention with regards to 16-bit data formats. However, it is to be understood that embodiments of the invention can be implemented in other systems such as 8-bit, 24-bit, 32-bit, and 64-bit systems, etc.

Embodiments of the present invention enable improved dynamic range and noise performance when compared to systems implementing typical data word formats for digital signal processing. Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

Figure 1:
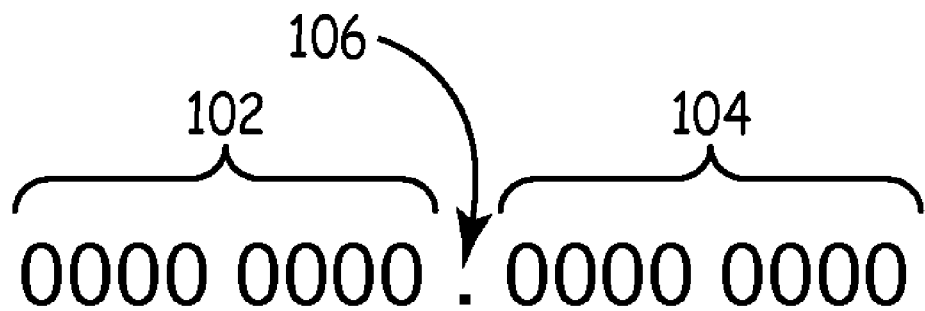
FIG. 1 is a representation of a 16-bit fixed point data format.

FIG. 1 is a representation of a typical 16-bit fixed point data format. As shown in FIG. 1, a typical fixed point data format comprises an integer segment 102 and a fractional segment 104 separated by an implied decimal point 106. Each bit of the integer segment 102 and fractional segment 104 can be a logical 1 or a logical 0. In addition, a typical fixed point format uses twos-compliment to indicate the sign of the number being represented. However, other methods are used to indicate the sign such as signed magnitude, one's compliment, and offset binary.

In this example, 8 bits are used for fractional segment 104 and 8 bits for integer segment 102. Although fixed point data formats are not limited to an equal division of bits between fractional segment 104 and integer segment 102, the division does not vary, once selected, fixing the implied decimal point 106. For example, the implied decimal point 106 can be fixed after the last bit (also referred to as an int type since integer segment 102 uses all 16 bits). Similarly, the implied decimal point 106 can be fixed before the first bit (also referred to as a fract type since fractional segment 104 uses all 16 bits).

The int type is natively supported in the C family of languages which are predominantly used for DSP algorithms. However, as implemented in C, the int type is highly susceptible to overflow. This overflow problem is due to a significant number of multiplications, and the product of a 16×16 bit multiplication is a 32-bit number. Also, the C int type uses truncation rather than rounding. Some of the problems associated with the int type are dealt with by the fract type. Although the fract type is not natively implemented in C, it is included in an extension called Embedded C. However, a 16-bit implementation of both the int type and fract type in C suffer from limited dynamic range and round-off noise when compared to a floating point format (also referred to as afloat type in C).

Figure 2:
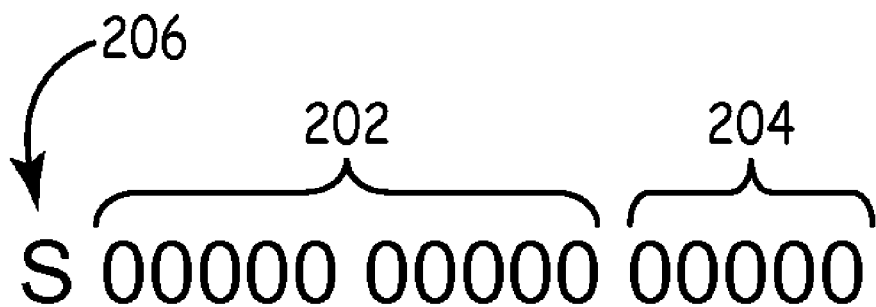
FIG. 2 is a representation of a 16-bit floating point data format.

FIG. 2 is a representation of a typical 16-bit floating point data format. A typical floating point data format includes a sign bit 206, a mantissa 202, and an exponent field 204. The format shown in FIG. 2 allocates 5 bits to exponent field 204 and 10 bits to mantissa 202. This format is also referred to as S10e5. Although the division of bits between the mantissa 202 and exponent field 204 is not limited to that shown in FIG. 2, the division does not vary once selected. The exponent field defines the location of the decimal point similar to the exponent used in scientific notation. The floating point format is typically implemented in 32-bit systems. However, a 16-bit floating point format (also referred to as a half format) is also used. Although, the floating point format has improved dynamic range and round-off error when compared to a fixed point format, processing using a floating point format is significantly slower than processing using fixed point formats.

FIG. 3 is a table showing a class of 16-bit irregular data formats according to embodiments of the present invention. As shown in FIG. 3, irregular data formats according to embodiments of the present invention, have a mantissa and an exponent field which each vary in size based, at least in part, on the numeric range or exponent to be represented. In particular, the class shown in FIG. 3 has two separate exponent fields, each of which vary in size. The exponent from each exponent field is given by the number of leading or trailing 0s. Each exponent field contains zero or more logical 0s and is separated from the mantissa by a logical 1.

Notably, although each exponent field is filled with logical 0s, embodiments of the present invention are not to be so limited. For example, in another embodiment, the exponent fields are filled with logical 1s and separated from the mantissa by a logical 0. Furthermore, in this embodiment, one of the exponent fields is located in the most significant bits (MSB) of the data word and the other exponent field is located in the least significant bits (LSB). However, it is to be understood that embodiments of the present invention are not to be so limited. For example, in some embodiments, both exponent fields are located in the MSB and separated from one another with a logical 1.

A number's actual value for this class of formats is given by the equation:

$$(-1)^S \times 1.M \times 2^{f(EL,ER)}$$

Notably, there is an implied "1." in the above equation. However, it is to be understood that the implied "1." can be replaced by an implied "0." in other embodiments. Each individual binary exponent is derived by examining both the left edge and right edge exponents (EL and ER). A mechanism is then used to map the two edge exponents into a single binary exponent f(EL,ER). For example, in some embodiments, a look up table or an algorithm is used to correlate the left edge and right edge exponents to a single binary exponent.

For each number of desired significant binary bits (i.e. the number of bits in the mantissa), there are one or more combinations of left and right edge exponent fields. For example, for 13 bits in the mantissa, there are two combinations and for 12 bits in the mantissa there are three possible combinations. Individual exponents (e.g. left or right edge exponents) can be combined to produce exponents of higher precision. For example, the left edge exponent from combination C1 can be combined with the right edge exponent from combination C2 in FIG. 3 to form a 13 bit exponent. Similarly, one 12-bit exponent can be combined with an exponent from each of the other precisions (11, 10, 9 . . . 1) to also create a 13 bit exponent.

Exponents can be ordered in any sequence, with the caveat that each binary range (e.g. 0.5 to 0.25) must be covered within the numeric range of the number format (e.g. 1.0 to $2^{-15}$ for fixed point fractional). The dynamic range of the format is the ratio of the upper and of the lower limit (multiplied by 2 if rounding is employed).

The class of irregular data formats shown in FIG. 3 provides 120 possible exponent combinations. Irregular data formats according to embodiments of the present invention are created by defining the exponent function f(EL,ER) effectively selecting at least one of the combinations shown in FIG. 3 for each numeric range to be represented.

In one embodiment, the function f(EL, ER) is defined as $-(R_0R_1 \ldots R_{N-1}+(2^N)X)$ where $R_0R_1 \ldots R_{N-1}$ is a fixed point binary number in the first exponent field corresponding to right shifts to be performed on the data in the mantissa and X is the number of zeros in a second exponent field corresponding to further right shifts. Substituting this function into the equation above yields the following:

$$(-1)S \times 0.M \times 2^{-(R_0R_1 \ldots R_{N-1}+(2^N)X)}$$

The number of zeros, X, in the second exponent field effectively corresponds to an exponent value which shifts the Mantissa to the right by $(2^N)X$. The binary number $R_0R_1 \ldots R_{N-1}$ corresponds to an exponent value which shifts the Mantissa further to the right based on the value of the binary number. Hence, the two exponent fields are effectively mapped into an equivalent single binary exponent which shifts the Mantissa to the right. One embodiment of an exemplary format implemented with this function is shown below:

$$SR_0R_1 \ldots R_{N-1}0_00_1 \ldots 0_{X-1}M_0M_1 \ldots M_{P-1},$$

where S is the sign bit, N is the number of bits in the first exponent field, X is the number of zeros in the second exponent field and P is the number of bits in the Mantissa. Notably, although signed magnitude convention is used in this example, it is to be understood that embodiments of the present invention are not to be so limited. For example, in other embodiments, two's compliment or one's compliment convention is used. As can be seen, the number of bits in the second exponent field (zero field) is variable rather than fixed. However, the length of the first exponent field or "R" field (i.e. the value of N) is fixed for a selected data format. Also, it is to be understood that the first or second exponent field can be located in the LSB rather than the MSB as described above.

Three exemplary irregular data formats derived from the general class of irregular formats described above are shown in FIGS. 4, 6, and 8. Although three irregular data formats are described below, it is to be understood that with 120 potential exponents available, together with the freedom to order them in any conceivable manner, other irregular formats can be used in other embodiments.

FIG. 4 is a table showing a 16-bit irregular half format according to one embodiment of the present invention. The irregular half format shown in FIG. 4 places the most resolution at 2 points. The first focal point for maximum precision is at 1.0 since filter and transform coefficients need high resolution at this point. The second point of maximum precision is placed at 32768.0 to cover the 16 bit integer range. One advantage of this irregular half format is that it provides a great programming convenience. Coefficients and data can naturally be cast into the same data type. Data can be moved between this irregular half format and the C int format with just an equal sign through implicit type conversion, which is a feature of the C programming language.

Figure 5:
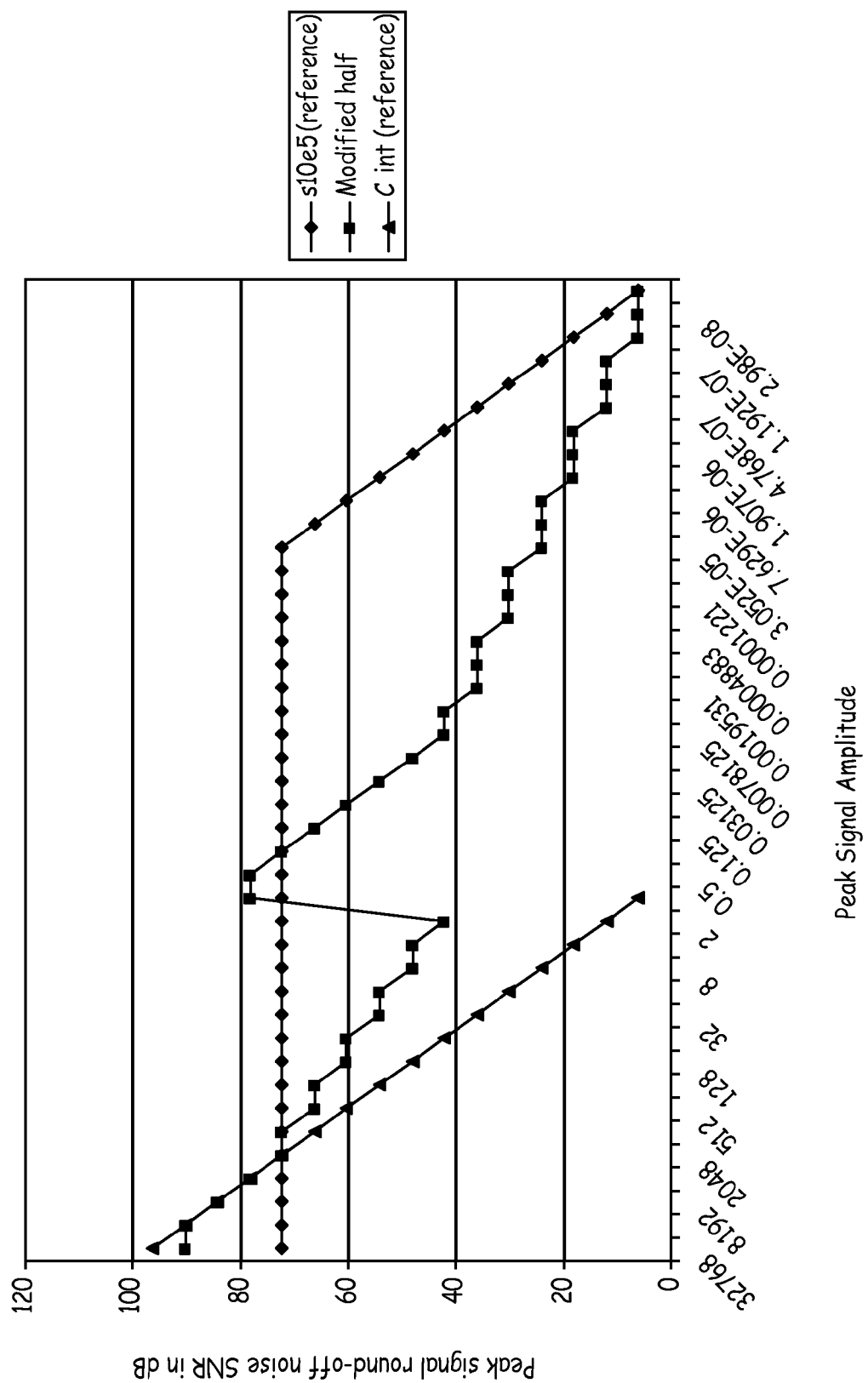
FIG. 5 is a chart comparing standard data formats to the 16-bit irregular half format.

FIG. 5 plots the peak signal level vs. the peak round-off noise level for the irregular half format shown in FIG. 4 together with the s10e5 and C int formats. As can be seen, at its two focal points, the irregular half format outperforms the s10e5. In addition, the irregular half format outperforms the C int format in virtually all situations.

FIG. 6 is a table showing a first 16-bit irregular fractional format according to one embodiment of the present invention. This irregular fractional format is optimized for fractional DSP and has the largest mantissas at the top of the numeric range. The mantissa then falls off gradually to the smallest mantissa. As can be seen, the implied digits are derived from an examination of the two exponent fields. In addition, a single bit of precision was sacrificed in the top two ranges when compared to typical fixed point. However, this irregular fractional format provides a significant dynamic range improvement over typical fixed point and s10e5 formats.

Figure 7:
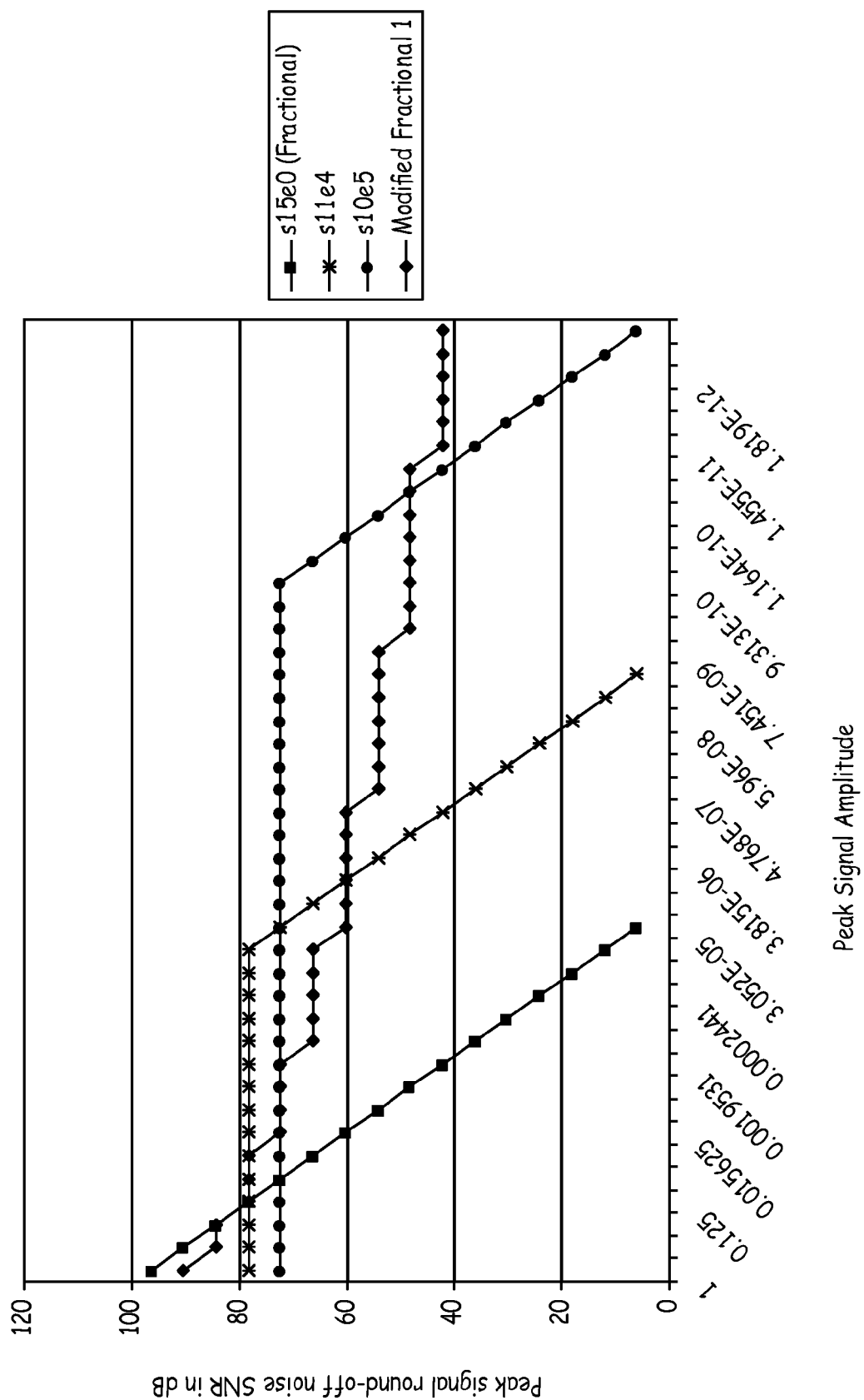
FIG. 7 is a chart comparing standard data formats to the first 16-bit irregular fractional format

FIG. 7 plots the peak signal level vs. the peak round-off noise level for the first irregular fractional format shown in FIG. 6 together with the s10e5, s11e4, and s15e0 formats. FIG. 7 shows that the first irregular fractional format outperforms each of the three reference formats in certain peak signal ranges.

FIG. 8 is a table showing a second 16-bit irregular fractional format according to another embodiment of the present invention. In the second irregular fractional format, creation of the first 15-bit magnitude is skipped. Then a single term from each of the ranges (A1 through M13 in FIG. 3) is combined to form a single 14-bit magnitude. This procedure is repeated to form a single 13-bit magnitude and on down the line as shown in FIG. 8. This leaves two terms of each exponent size ordered in decreasing precision.

Figure 9:
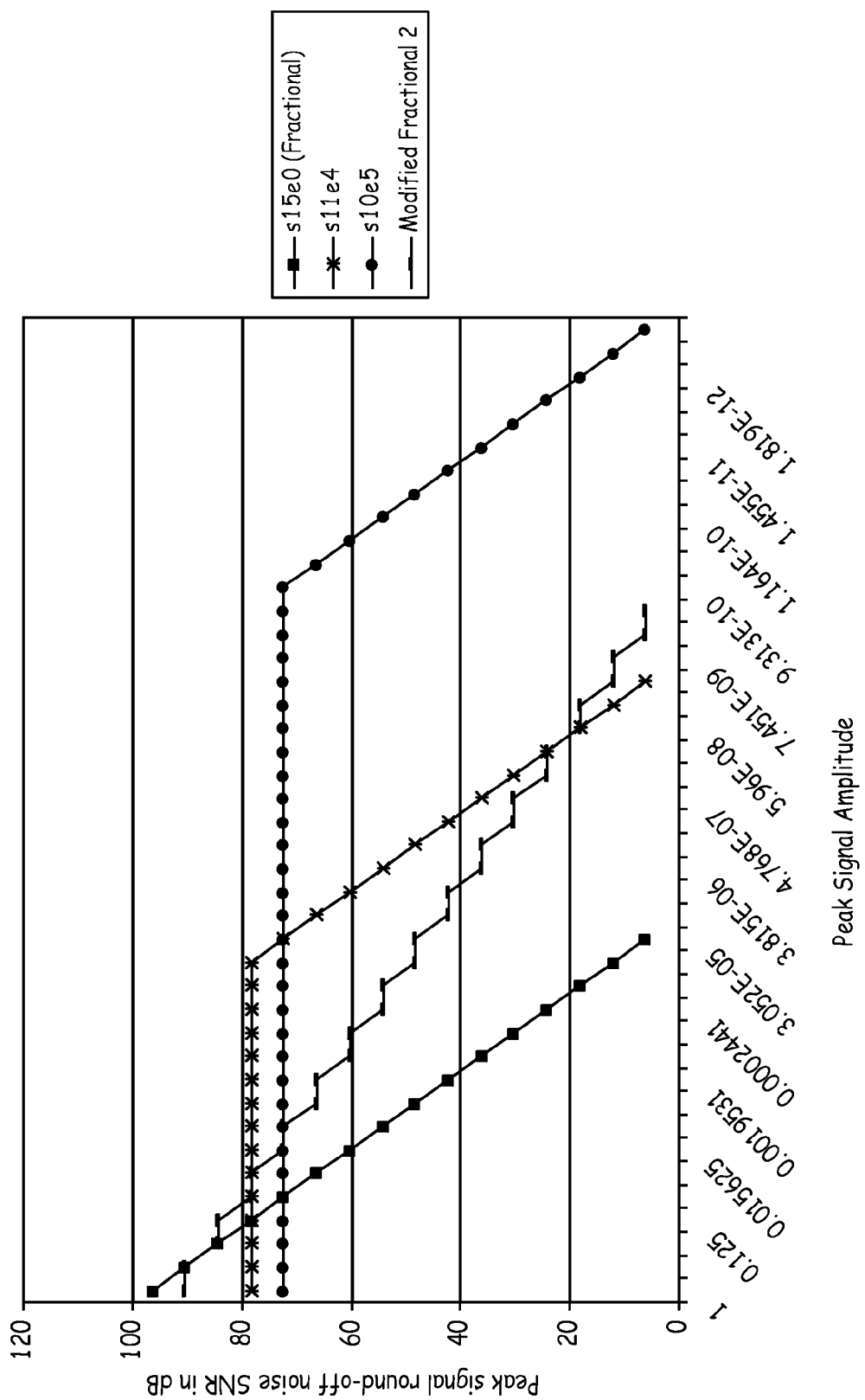
FIG. 9 is a chart comparing standard data formats to the second 16-bit irregular fractional format.

FIG. 9 plots the peak signal level vs. the peak round-off noise level for the second irregular fractional format shown in FIG. 8 together with the s10e5, s11e4, and s15e0 formats. The dynamic range of this second irregular fractional format is almost double that of the fixed point fractional format in dB, and falls in between that of s11e4 and s10e5 floating point. The total dynamic range of the second irregular fractional format is over 180 dB, which is an improvement of 84 dB over fixed point.

Figure 10:
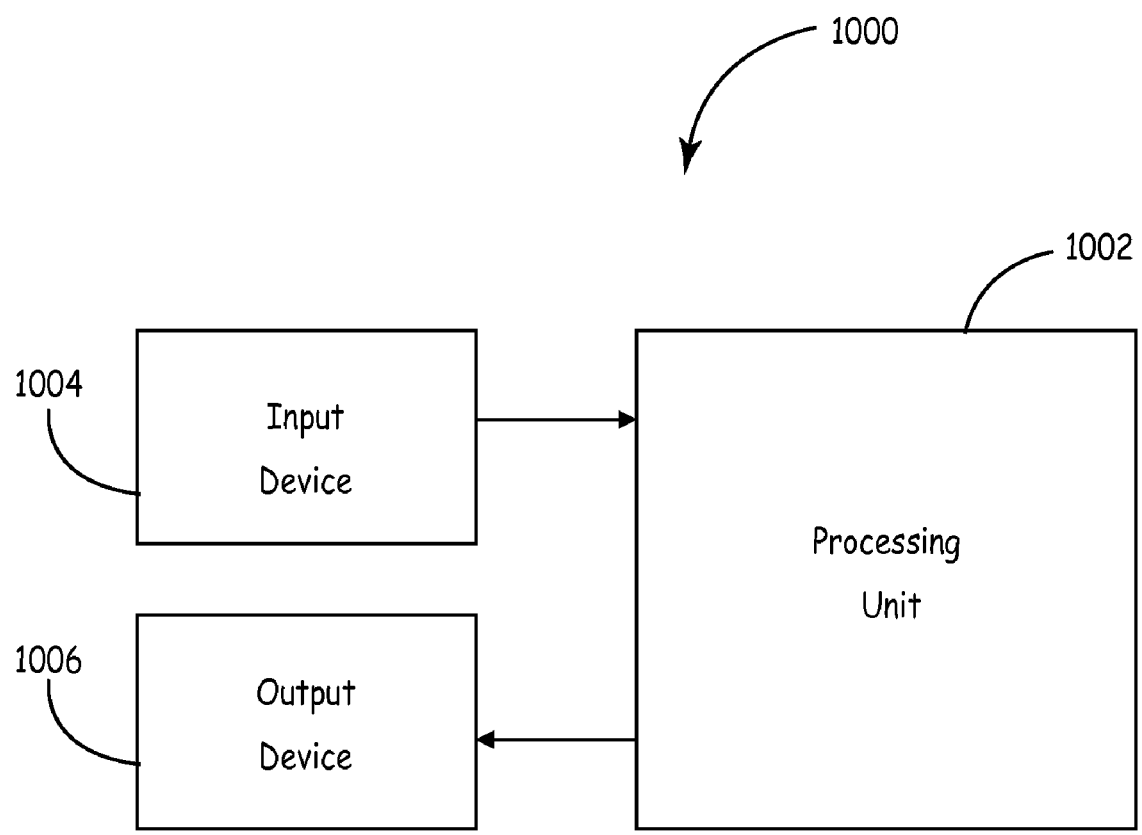
FIG. 10 is a block diagram of a system according to one embodiment of the present invention.

FIG. 10 is a block diagram of a system 1000 according to one embodiment of the present invention. System 1000 implements irregular data formats as described above and includes an input device 1004, an output device 1006, and a processing unit 1002. Input device 1004 is configured to provide signals containing data words to processing unit 1002 and output interface 1006 is configured to output signals containing data words processed by processing unit 1002. In particular, input device 1004 can be implemented as a sensor, a receive antenna, a user input device (e.g. keyboard, number pad, mouse, touchscreen, etc.) and the like. Output device 1006 can be implemented as a speaker, a display element, a transmit antenna, etc.

Processing unit 1002 processes data words received from input device 1004. In particular, processing unit 1002 is configured to process data words which comprise a mantissa of variable size and at least one exponent field of variable size as described above. In this embodiment, processing unit 1002 is configured to process data words having two separate exponent fields of variable size.

In this example, processing unit 1002 detects the first exponent field by locating a pattern of logical zeros in the most significant bits of the data word separated from the mantissa by a logical one. Similarly, in this example, processing unit 1002 detects the second exponent field by locating a pattern of logical zeros in the least significant bits of the data word separated from the mantissa by a logical one. As can be seen in the irregular data formats above, in some instances the data word simply has a logical 1 in the most significant bit or least significant bit. Processing unit 1002 interprets such instances as indicating an exponent field with no zeros.

Processing unit 1002 derives two exponent components from the two exponent fields, one component from each exponent field. In this example, each exponent component is derived by counting the number of zeros in each exponent field. Processing unit 1002 then maps the two exponent components into a single binary exponent. For example, in this embodiment, processing unit 1002 uses a look-up table to correlate the two exponent components with a single binary exponent.

In some embodiments, processing unit 1002 performs calculations using the irregular data word having two variable size exponent fields. In other embodiments, processing unit 1002 converts a received data word having two variable size exponent fields into a data word having one exponent field of fixed size (e.g. a floating point format) and performs calculations using the converted data word format. Processing unit 1002 then converts the calculation results to a data word having two variable size exponent fields prior to outputting the results. In addition, in some embodiments, processing unit 1002 generates data words having two variable size exponent fields to be output to output device 1006.

Processing unit 1002 includes or functions with software programs, firmware or computer readable instructions for carrying out various methods, process tasks, calculations, and control functions, used in processing data words having two variable sized exponent fields. These instructions are typically tangibly embodied on any appropriate medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Figure 11:
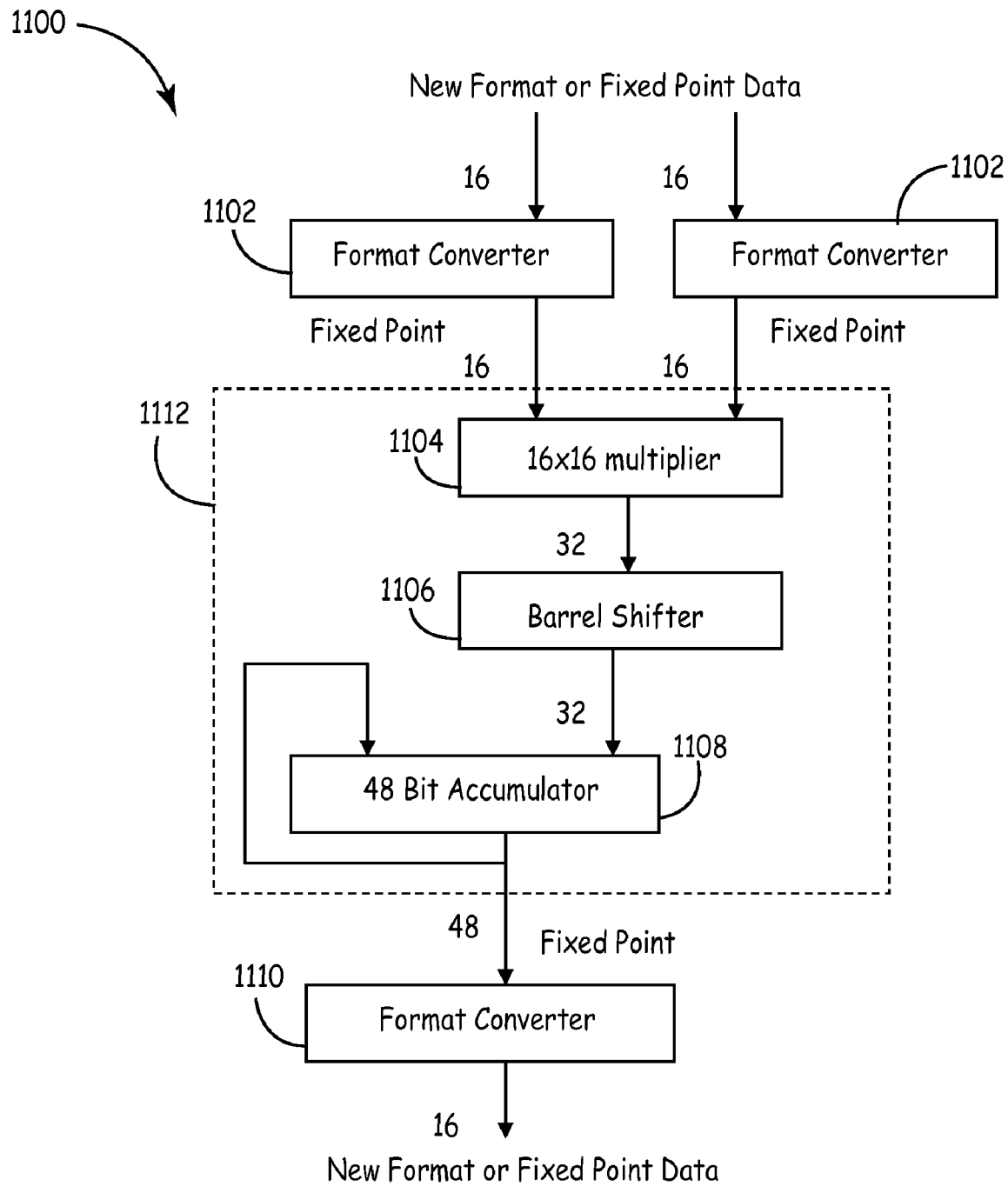
FIG. 11 is a block diagram of a processing unit according to one embodiment of the present invention.

FIG. 11 is a block diagram of a processing unit 1100 according to one embodiment of the present invention. Processing unit 1100 is a digital signal processing unit and includes a multiply accumulate circuit 1112 comprising a multiplier 1104, a barrel shifter 1106, and an accumulator 1108. A multiply-accumulate operation in multiply accumulate circuit 1112 is completed in a single cycle. In this embodiment, the accumulator 1108 is a 48-bit accumulator whereas a typical accumulator in a 16-bit digital signal processor is a 40-bit accumulator. Notably, although a 16-bit digital signal processor is shown in FIG. 11, it is to be understood that other size digital signal processors are used in other embodiments.

In addition, processing unit 1100 includes two entrance format converters 11102. Entrance format converters 1102 are configured to receive and convert an irregular data word comprising at least one exponent field and mantissa, each of variable size, into a fixed point data word format. Entrance format converters 1102 are also configured to pass received fixed point data to multiply accumulate circuit 1112 without conversion. Multiplier 1104 is configured to multiply together the converted data word from each of the entrance format converters 1102. Barrel shifter 1106 shifts bits in the multiplication result as known to one of skill in the art. Accumulator 1108 then accumulates the multiplication results received from barrel shifter 1106. In some embodiments, processing unit 1100 also includes exit format converter 1110 which is configured to convert the multiplication results received from accumulator 1108 to an irregular data format having at least one exponent field and mantissa, each of variable size.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A computer system comprising:
    a processing unit configured to process fixed size data words comprising two separate exponent fields, at least one of the exponent fields of variable size, and a mantissa of variable size;
    an input device configured to provide data words to the processing unit; and
    an output device configured to output data words processed by the processing unit.

2. The computer system of claim 1, wherein the processing unit is configured to process one of 8-bit fixed size data words, 16-bit fixed size data words, 24-bit fixed size data words and 32-bit fixed size data words.

3. The computer system of claim 1 wherein the processing unit comprises:
    a first entrance format converter;
    a second entrance format converter;
    wherein each of the first and second entrance format converters is configured to receive and convert a data word comprising at least one exponent field of variable size and a mantissa of variable size into a fixed point data word format; and a multiply accumulate circuit (MAC) configured to multiply the converted data word from the first entrance format converter with the converted data word from the second entrance format converter and accumulate the result of the multiplication.

4. The computer system of claim 3, wherein the processing unit further comprises an exit format converter configured to convert the accumulated result of the multiplication into a data word format comprising at least one exponent field and a mantissa, each of varying size.

5. The computer system of claim 1, wherein the processing unit is configured to map an exponent component from each of the two separate exponent fields to a single binary exponent.

6. The computer system of claim 1, wherein the input device comprises one of a sensor, a receive antenna, a keyboard, a number pad, a mouse, and a touchscreen.

7. The computer system of claim 1, wherein the output device comprises one of a speaker, a display element, and a transmit antenna.

8. A digital signal processing unit comprising:
a first entrance format converter;
a second entrance format converter;
wherein each of the first and second entrance format converters is configured to receive and convert a data word comprising at least one exponent field of variable size and a mantissa of variable size into a fixed point data word format; and
a multiply accumulate circuit (MAC) configured to multiply the converted data word from the first entrance format converter with the converted data word from the second entrance format converter and accumulate the result of the multiplication.

9. The digital signal processing unit of claim 8, further comprising an exit format converter configured to convert the accumulated result of the multiplication into a data word format comprising at least one exponent field and a mantissa, each of varying size.

10. The digital signal processing unit of claim 8, wherein the first and second entrance format converters are configured to pass received fixed point data words to the multiply accumulate circuit without conversion.

11. The digital signal processing unit of claim 8, wherein the multiply accumulate circuit comprises:
a 16-bit by 16-bit multiplier configured to multiply together the converted data word from each of the entrance format converters; and
a 48-bit accumulator configured to accumulate the result of the multiplication.

12. A program product comprising program instructions embodied on a processor-readable medium for execution by a programmable processor, wherein the program instructions are operable to cause the programmable processor to:

detect a first exponent field in a received data word of fixed size;
detect a second exponent field in the data word;
derive two exponent components, one exponent component from the first detected exponent field and one exponent component from the second detected exponent field; and
map the two exponent components into a single binary exponent.

13. The program product of claim 12, wherein the program instructions are further operable to cause the programmable processor to:
detect the first exponent field by locating a first pattern of logical zeros separated from the mantissa of the data word by a logical one; and
detect the second exponent field by locating a second pattern of logical zeros separated from the mantissa of the data word by a logical one.

14. The program product of claim 13, wherein the program instructions are further operable to cause the programmable processor to:
derive two exponent components from the first and second exponent fields by counting the number of logical zeros in each of the first and second exponent fields.

15. The program product of claim 12, wherein the program instructions are further operable to cause the programmable processor to:
detect the first exponent field by locating a binary number in the most significant bits of the data word; and
detect the second exponent field by locating a pattern of logical zeros separated from the mantissa of the data word by a logical one.

16. The program product of claim 12, wherein the program instructions are further operable to cause the programmable processor to:
map the two exponent components into a single binary exponent by using one of a lookup table and an algorithm which associates the two exponent components with a single binary exponent.

17. The program product of claim 12, wherein the program instructions are further operable to cause the programmable processor to:
format a new data word of fixed size with a mantissa and at least one exponent field, wherein the size of the mantissa and the size of the at least one exponent field vary based, at least in part, on a numerical value being represented by the new data word.

18. The program product of claim 17, wherein the program instructions are further operable to cause the programmable processor to:
output the new data word to an output device.

19. The program product of claim 12, wherein the program instructions are further operable to cause the programmable processor to:
convert the received data word to a fixed point data word format.

* * * * *